July 16, 1929.   M. T. WINTSCH   1,720,940
AUTOMATIC TRAIN CONTROL APPARATUS
Filed Dec. 3, 1927
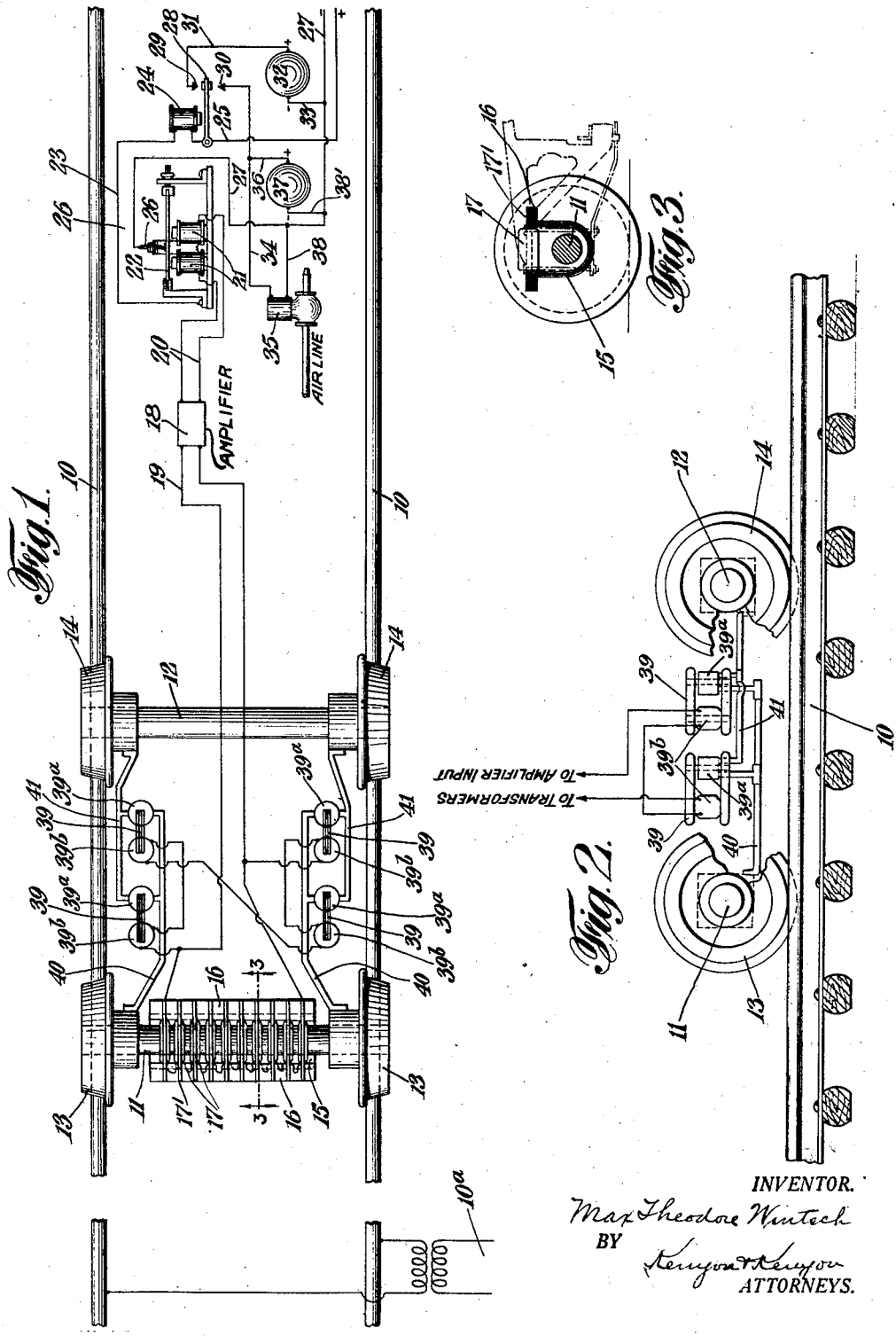
INVENTOR.
Max Theodore Wintsch
BY
Kenyon & Kenyon
ATTORNEYS.

Patented July 16, 1929.

1,720,940

UNITED STATES PATENT OFFICE.

MAX THEODORE WINTSCH, OF LANCASTER, PENNSYLVANIA, ASSIGNOR TO THE LOWELL-WINTSCH AUTOMATIC TRAIN CONTROL CORP., OF LANCASTER, PENNSYLVANIA, A CORPORATION OF DELAWARE.

AUTOMATIC TRAIN-CONTROL APPARATUS.

Application filed December 3, 1927. Serial No. 237,396.

This invention relates to train control devices and pertains more especially to devices which automatically and continuously control the operation of a train.

In applicant's copending application Ser. No. 142,789, filed October 20, 1926, there is disclosed an automatic train control apparatus of the continuous type in which the air brake line is controlled by a valve held closed by a solenoid when the latter is energized and which valve opens automatically under the brake line pressure upon deenergization of the solenoid. The solenoid current is controlled by a relay energized by current induced in its field circuit by current shunted through the front axle of the train from the rails. The induced current is impressed upon the in-put circuit of an amplifier, the out-put circuit of which includes the control relay.

An object of this invention is an improved means for picking up the control current primarily by direct electrical contact and transformation, and secondarily by magnetic induction from the rails to obtain for the amplifier greater and more continuous flowing operating current than heretofore.

Another object of this invention is an improved control circuit by means of which the brakes are caused to operate and the proper signal light is displayed.

According to this invention, there is provided an amplifier, tuned relay, a brake control solenoid and a relay controlled by the tuned relay for controlling the energization of the solenoid. The in-put circuit of the amplifier is inductively connected to the front axle of the train and each end of the front axle is connected to the corresponding end of the second axle through the primaries of one or more step-up transformers. Such primaries being of very low resistance, the secondaries of all the transformers are connected in series with each other and in parallel to the inductive connection with the front axle. By means of this arrangement, the intensity of the current impressed upon the in-put of the amplifier is increased and the operation of the control device is made more sensitive.

The relay is tuned to vibrate at the frequency of the control current supplied to the rails. So long as current is supplied to the rails and flows through the train axle, the reed of the tuned relay vibrates with the result that the solenoid controlling the operation of the air brake valve is energized and maintains the valve closed. Upon failure of current to flow through the train axle for any cause, the reed of the tuned relay ceases to vibrate and permits de-energization of said solenoid so that the brakes are applied.

Other objects, novel features and advantages of this invention will be apparent from the following description and appended claims, wherein Fig. 1 is a diagrammatic plan view of an apparatus embodying the invention;

Fig. 2 is a diagrammatic side view thereof; and

Fig. 3 is a section on the line 3—3 of Fig. 1.

10 designates the usual rails upon which a train runs and which are connected at the exit end of a block in the usual manner with any suitable source of alternating current as at 10ª. 11 designates the front axle of a vehicle arranged to run on the tracks 10 and 12 designates the second axle of such vehicle. Upon the axles are mounted wheels 13 and 14 which run upon the tracks 10. The wheels are electrically connected with the axle so that each one shunts current between the rails 10. A metallic trough shape member 15 surrounds the axle 11 and has horizontally projecting ears 16. Preferably the member 15 is made up of several laminations of silicon iron. A plurality of serially connected coils 17 are supported between the upper edges of the member 15 by laminated cores 17′ projecting beyond the ends of the coils.

18 designates an amplifier preferably of the vacuum tube type, the in-put circuit 19 of which includes the serially connected coils 17 and the out-put circuit 20 of which includes the field winding 21 of the tuned reed relay. The armature of this relay comprises a reed 22 supported at either end and provided with means for varying its natural period of vibration. A conductor 23 leads from the reed 22 to the field winding of a relay 24 which is connected through the conductor 25 with the positive pole of a source of electric energy not shown. A contact 26 is supported above the reed 22 in a position to be engaged by the contact 26ª carried by the reed 22. A conductor 27 connects the contact 26 with the negative pole of the source of electric energy above mentioned. The armature 28 of the relay 24 is adapted to engage either of the contacts 29 and 30 and is itself connected to the conductor 25. The contact 29 is connected by conductor 31 with one terminal of a red lamp 32, the other terminal of which is connected by a conductor 33 with conductor 27. Contact 30 is connected through conductor 34 with one terminal of the field winding of a solenoid 35 and through conductor 36 with one terminal of a green lamp 37. The other terminals of the solenoid 35 and lamp 37 are connected through conductors 38 and 38' with the conductor 27. The solenoid 35 is adapted when energized to hold closed the valve controlling the air line and when de-energized to release the valve to open the air line to the atmosphere.

In addition there are connected to the input circuit 19 and in shunt to the coils 17 the secondaries of a plurality of transformers 39. These transformers are arranged in two sets, one at either side of the vehicle and are of the iron core type. The primaries 39$^a$ are composed of a relatively few turns of heavy copper strips and the secondaries 39$^b$ are composed of a large number of turns of fine wire. One terminal of each primary is connected by means of a cable 40 of high conductivity with the bearing box of the front axle and the other terminal is connected by means of cable 41 also of high conductivity with the bearing box of the second axle and are thus electrically connected to the axles 11 and 12 as well as the wheels 13 and 14. The secondaries 39$^b$ of the transformers are connected in series with each other and are connected to the in-put circuit 19 in parallel with the coils 17.

The operation of this apparatus is as follows:

The adjustment of the reed 22 is such that its natural period of vibration is the same as the frequency of the signalling current. When a train enters a clear block, signalling current flows through the axle 21 between the rails 10 and also through the low loss primaries 39$^a$ of the transformers 39. Flow of current through the axle induces current in the coils 17 and flow of current through the primaries 39$^a$ induces current in the secondaries 39$^b$. The current thus induced is impressed upon the in-put circuit 19 of the amplifier 18. A current of the same frequency is produced in the out-put circuit of the amplifier. The reed 22 is caused to vibrate at its natural frequency so that the circuit through the field winding 24 is interrupted at the same frequency. As a result, the relay 24 will be de-energized and the armature 28 will rest upon the contact 30. This closes the circuit through the green lamp 37 and the solenoid 50, thus giving the engineer the clear signal and holding closed the air brake valve. However, if there is another train in the block, this first train will have shunted a major portion, if not all, of the current so that there will be substantially no flow through the axle 11 or primaries 39$^a$. As a result, the current in the out-put circuit 20 of the amplifier will be insufficient to operate the reed 22 and as a result the relay 24 will be energized and the armature 28 lifted into engagement with the contact 29. The circuit through the green lamp 37 and solenoid 35 is thereby broken. The circuit through the red lamp 32 is thus closed. The solenoid 35 being de-energized, the air brake valve is permitted to open, thus exhausting the brake pipe pressure to atmosphere and thereby applying the brakes. The same operation is accomplished whenever there is no flow of current through the axle for any cause whatever.

It is of course apparent that various modifications may be made without in any way departing from the spirit of the invention as defined in the appended claims.

I claim:

1. Automatic train control apparatus comprising rails connected with a source of alternating current, a vehicle mounted on said rails, a valve for controlling the application of the vehicle brakes, electromagnetic means for holding the valve closed, an amplifier, a relay in the output circuit of said amplifier for controlling energization of said electromagnetic means, an in-put circuit for said amplifier, and two sets of transformers having their secondaries connected in series with each other and forming part of said in-put circuit, each set of transformers having the terminals of their primaries connected to adjacent wheels on one side of said vehicle.

2. Automatic train control apparatus comprising rails connected with a source of alternating current, a vehicle mounted on said rails, a valve for controlling the application of the vehicle brakes, electromagnetic means for holding the valve closed, an amplifier, a relay in the out-put circuit of said amplifier for controlling energization of said electromagnetic means, an in-put circuit for said amplifier, an inductive connection between an axle of said vehicle and said in-put circuit, and transformers having their secondaries connected in series with each other and to said in-put circuit in shunt to said inductive connection and having the terminals of their primaries connected to adjacent wheels on one side of said vehicle.

3. Automatic train control apparatus comprising rails connected with a source of alternating current, a vehicle mounted on said rails, a valve for controlling the application of the vehicle brakes, electromagnetic means for holding the valve closed, an amplifier, a relay in the out-put circuit of said amplifier for controlling energization of said electromagnetic means, an in-put circuit for said amplifier, an inductive connection between an axle of said vehicle and said in-put circuit, and two sets of transformers having their secondaries connected in series with each other and to said in-put circuit in shunt to said inductive connection, each set of transformers having their primaries connected in series with adjacent wheels on one side of the vehicle.

4. Automatic train control apparatus comprising rails connected with a source of alternating current, a vehicle mounted on said rails, a valve for controlling the application of the vehicle brakes, electromagnetic means for holding the valve closed, an amplifier for controlling energization of said electromagnetic means, an in-put circuit for said amplifier, transformers having their primaries connected in series with adjacent wheels on each side of the vehicle, the secondaries being connected in series with each other and forming a part of said in-put circuit, and an inductive connection between said in-put circuit and one axle of the vehicle, said inductive connection being in shunt to the secondaries of said transformers.

5. Automatic train control apparatus comprising rails connected with a source of alternating current, a vehicle mounted on said rails, transformers having their primaries connected in series with adjacent wheels on each side of the vehicle, an amplifier, means connecting the secondaries of said transformers in series with each other and forming a part of the in-put circuit of said amplifier, an inductive connection between said in-put circuit and one axle of the vehicle, said inductive connection being in shunt to the secondaries of said transformers, a valve for controlling the application of the vehicle brakes, electro-magnetic means for holding the valve closed, a relay for controlling energization of said electro-magnetic means, and a tuned relay in the out-put of said amplifier for controlling the energization of said relay.

6. Automatic train control apparatus comprising rails connected with a source of alternating current, a vehicle mounted on said rails, an amplifier, an in-put circuit for said amplifier, two sets of transformers having their secondaries connected in series with each other and forming part of said in-put circuit, each set of transformers having the terminals of their primaries connected to adjacent wheels at one side of the vehicle, a valve for controlling the application of the vehicle brakes, electro-magnetic means for holding the valve closed, a relay for controlling energization of said electro-magnetic means, and a tuned relay in the out-put circuit of said amplifier for controlling the energization of said first relay.

In testimony whereof I have signed my name to this specification.

MAX THEODORE WINTSCH.